Sept. 19, 1944.  C. L. DEWEY  2,358,307
TUBE REDUCING MACHINE
Filed Aug. 29, 1942  2 Sheets-Sheet 1
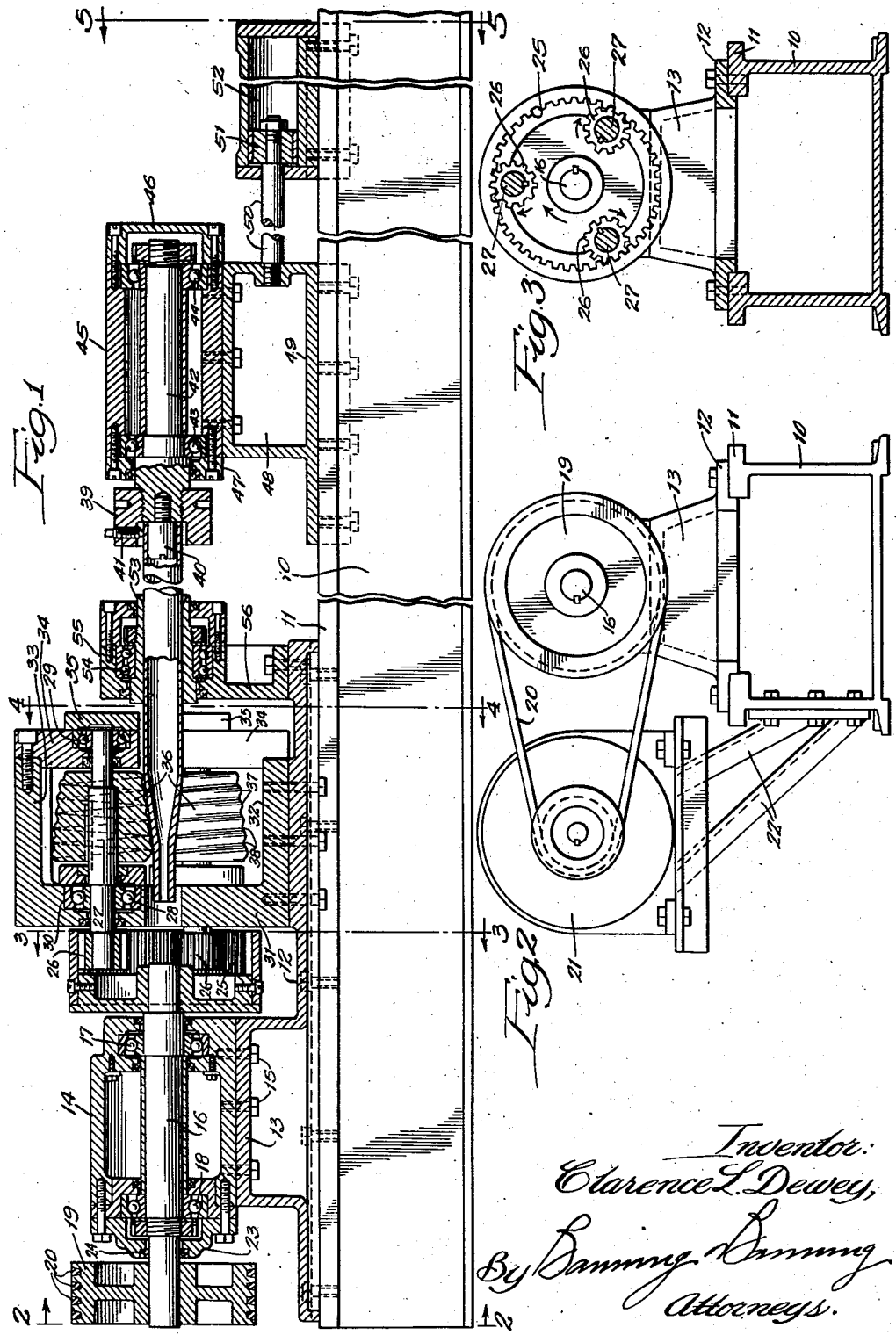
Inventor:
Clarence L. Dewey,
By Banning Banning
Attorneys.

Sept. 19, 1944.   C. L. DEWEY   2,358,307
TUBE REDUCING MACHINE
Filed Aug. 29, 1942   2 Sheets-Sheet 2

SPIRAL CREST LINE AFFORDING CONTACT POINTS RAPIDLY MOVING ALONG TUBE FROM B TO A WHILE TUBE ADVANCES SLOWLY FROM C TO D

Inventor:
Clarence L. Dewey,
By Emmy Emmy
Attorneys.

Patented Sept. 19, 1944

2,358,307

UNITED STATES PATENT OFFICE 2,358,307

TUBE REDUCING MACHINE

Clarence L. Dewey, Elkhart, Ind.

Application August 29, 1942, Serial No. 456,588

6 Claims. (Cl. 80—13)

The present invention is directed to the employment of a group of spirally grooved reducing rolls, preferably three in number, which are tapered from end to end in such a way as to progressively reduce the end of a section of tubing to thereby produce a tapering reduction in the end of the tube which may be a smooth straight taper or one of variable character depending upon the configuration of the spirally grooved surfaces of the rolls.

In order to produce a smoothly tapered surface as distinguished from one presenting a spiral groove or thread, it is necessary to so time the peripheral speed of the rolls in ratio to the advance of the tube that the rolls will make numerous rotations while any given point on the tube wall is advancing from the crest of one convolution to the next so that the spiral lines of the crests of the corrugation will sweep longitudinally along the tube surface at a speed greatly in excess of the travel of the tube, thereby brushing out and ironing down any grooves or inequalities in the tube surface which might otherwise be produced if the tube surface traveled uniformly at a rate corresponding to the pitch of the corrugations.

For purposes of illustration I have shown a machine in which the corrugated forming rolls maintain a fixed position and are positively driven, while the tube is advanced longitudinally and rotated by the frictional contact of the rolls, but the principle involved is equally applicable to a machine in which the tube is held in position and in which the rolls are advanced and revolved around the tube so that it will be understood that unless otherwise indicated, such a reversal of operations is included.

Further objects and details of the invention will appear from the description thereof in conjunction with the accompanying drawings, wherein:

Figure 1 is a sectional elevation partially broken away and illustrating a suitable embodiment of the present invention;

Fig. 2 is an end elevation taken on line 2—2 of Fig. 1;

Fig. 3 is a cross-sectional view taken on line 3—3 of Fig. 1;

Figure 9:
Figure 10:
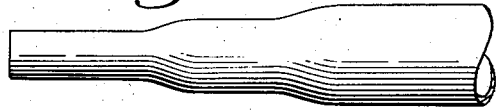
Figure 11:
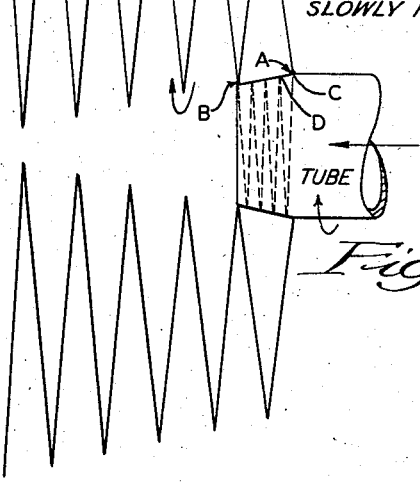

Figures 6, 7, 8, 9, and 10 are views representing variations in the character of the taper imparted to the end of a section of tubing; and Fig. 11 is a diagram illustrating the principle involved.

The machine as a whole is mounted upon a frame 10 provided along its upper edges with track rails 11 which serve to support a head base 12, offset upwardly at its outer end to provide a platform 13 for the support of a head stock 14 which is secured thereto by bolts 15. The head stock provides a mounting for a spindle 16 which is journaled within ball bearings 17 and 18 and which mounts on its outer end a sheave 19 driven by belts 20 which derive power from a motor 21 carried by a suitable bracket 22. The bearings are protected by an outer bearing cap 23 and oil seal rings 24. The spindle 16 at its inner end has keyed thereon an internal gear 25 which is meshed with three pinions 26 mounted upon reduced ends of three equally spaced roll shafts 27 journaled within ball bearings 28 and 29, the former groups of ball bearings being respectively carried within recesses 30 in a generally circular head plate 31 flattened at its bottom 32 which is rested upon the head base 12 and is bolted or otherwise secured thereto.

The head plate 31 carries three equally spaced inwardly extending arms 33, each of which at its outer end has bolted thereto a radially inwardly extending journal mounting plate 34 which is recessed to receive the associated ball bearing assembly 29, which latter is held in position by removable cap plate 35.

The shafts 29 provide mountings for three forming rolls 36 which more particularly form the subject matter of the present invention. Each of the rolls is keyed to its shaft and is of generally tapering configuration, increasing in diameter toward its outer end with a corresponding progressive reduction in the clearance between the acting surfaces of the rolls, each of which is corrugated in the form of a spirally extending rounded ridge 37 between the turns of which the surface affords a spirally extending valley 38.

As shown, each of the rolls presents the surface contour comparable to that of a tapered screw having a single continuous thread, although the present invention is one in which a similar result might be obtained by multiple intervening corrugations formed in the nature of threads, the object being to provide a spirally corrugated or threaded surface in the nature of a screw having a relatively steep pitch with the acting surfaces of the spiral corrugations (or interlying corrugations) rounded so that the respective turns will present convexly rounded points of contact with the tube to be reduced.

Figure 4:
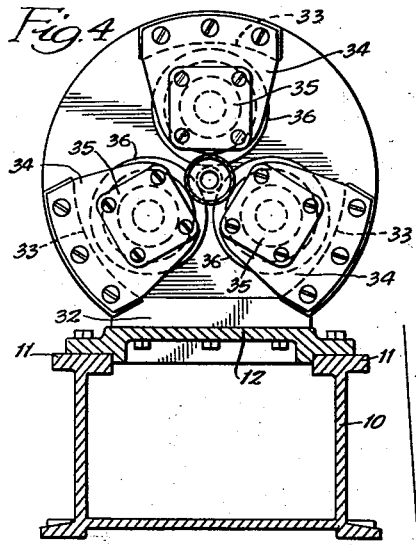
Fig. 4 is a sectional elevation taken on line 4—4 of Fig. 1.
Figure 5:
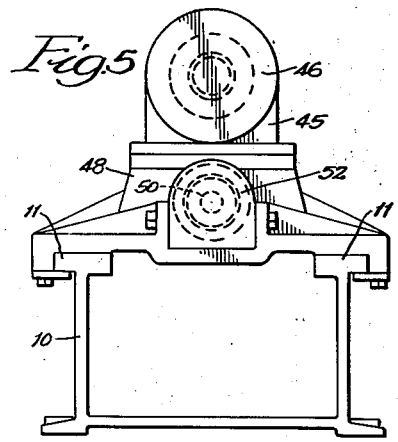
Fig. 5 is an end view taken on line 5—5 of Fig. 1.
Figure 6:
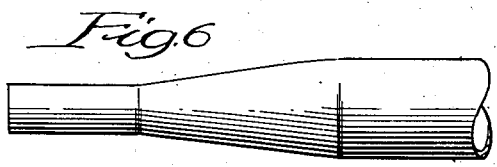
Figure 7:
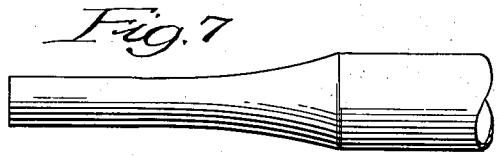
Figure 8:

Although in Figure 1 I have shown a set of three forming rolls whose crest lines of contact present a uniformly tapered conical outline, it is to be understood that the surface of the rolls may be otherwise configured to afford either a concavely rounded area of clearance to produce the tube reduction illustrated in Fig. 7, on a convexly rounded area of clearance required in the production of the tube shown in Fig. 8, or various combinations or interruptions thereof, as indicated by the tube forms shown in Figures 9 and 10, or others of generally similar character.

The end of the tube to be reduced is carried by a rotating chuck 39 provided with a centering plug 40 which enters the rear end of the tube and coacts with set screws 41 or other suitable clamping means for holding the tube end rigidly clamped to the chuck.

The chuck is carried by a tail spindle 42 journaled within ball bearings 43 and 44 socketed within a tail stock 45 closed at its rear end by a cap 46 and its opposite end by a forward cap 47. The tail stock is mounted upon an elevated base 48 supported upon a carriage plate 49 which rides upon the rails 11 and is actuated by a ram 50 provided with a piston 51 operating within an hydraulic cylinder 52, fixedly though adjustably mounted upon the rails 11. In order to properly center the projecting forward end of the tube, a throated sleeve 53 is provided which closely surrounds the tube and which is journaled within ball bearings 54 socketed within a supporting head 55, carried by a standard 56, which is bolted to the base 12.

*Operation*

With the chuck carriage 49 retracted to the required extent to permit the mounting of a tube section, the rear end of the latter is clamped within the chuck and the forward end entered through the tube supporting sleeve 53 and in position to be brought within the bite of the forming rolls when the carriage is advanced. With the tube thus mounted, power is applied to rotate the spindle 16 carrying the internally threaded gear 25 which simultaneously imparts equal rotation to the three equally spaced roll pinions 26 so that the forming rolls will rotate in unison, and at a relatively high rate of speed which is desirable in order to effect the reduction of the end of the tube without grooving the latter. The carriage will then be slowly advanced to carry the tube into the progressively reducing clearance space between the forming rolls which contact the tube surface at three equally spaced angular positions around the tube axis so that the tube will be accurately centered and held against deflection during the reducing operation and rotated by the frictional contact of the rolls at a surface speed equal thereto.

As the tube advances, the spiral crests or corrugations on the tubes will provide aligned multiple points of contact, each separated by an intervening space which is highly desirable in order to permit the metal to flow down beneath the contacting surfaces and to be redistributed evenly and uniformly since it has been found that a continuous line of contact with tapering forming rolls affords no adequate areas of clearance for the redistributing of the metal during the reducing operation which tends to gall the metal surface and otherwise produce deleterious effects in the structure of the metal. By affording on each roll a plurality of spaced contact points which are constituents of a continuous spirally extending corrugation and by rotating the rolls at a surface speed sufficiently rapid to cause the spirally moving lines of contact to travel longitudinally at a speed many times greater than the axial advance of the tube, so that a given point on the tube travels in a spiral of much lower pitch than that of the corrugations, any tendency to form spiral grooves or threads in the tube surface will be overcome, and smoothly surfaced reduction will be effected.

This is for the reason that the pitch lines of the corrugations intersect and sweep over the pitch lines of points on the advancing and frictionally rotated tube at a very considerable angle so that contacting crests of the continuous corrugations perform a sweeping or brushing action concurrently with the reducing action which irons out the tube surface.

As the tube is forced inwardly through the reducing clearance between the rolls, it will be given a contour complementary save for the absence of surface grooving to that of the clearance space between the rolls, which latter may be configured to impart the desired contour, either uniformly tapering or otherwise, to the tube, the tip end of which, if advanced beyond the region of deformation, will present the reduced cylindrical form indicated, with a progressively increasing thickness of the wall occasioned by the redistributing of the metal.

It will be understood, however, that although I have here shown each roll provided with a single corrugation uniformly increasing in diameter from end to end to present a straight tapered line of crests, it is possible to interrupt the continuity of the tapering, particularly where cylindrical intermediate reductions of the character shown in Figure 10 are desired, and such variations in configuration are deemed to be within the principles of the present invention.

Let it be understood that where I refer to forming rolls having a spirally corrugated surface, I intend to include not only a single spiral corrugation presenting a multiplicity of crest points of contact within a single crest line, but also intend to cover and include as an equivalent a plurality of intervening spiral corrugations having, however, in every case a steeper pitch line than the pitch line on a given point on the advancing tube so that the brushing or ironing function previously described will occur during the rotation of the tube within the bite of the rolls.

In Fig. 11 I have shown diagrammatically how in a single rotation of the upper forming roll a given point of pressure contact applied at A will travel longitudinally through the distance A—B which is many times the distance traveled by a given point on the tube surface during the same interval which is represented by C—D which indicates that the evolving pressure line sweeps along the tube surface and does not coincide in pitch with the spiral movement of a given point on the tube surface thereby tending to brush out any grooves or inequalities which might otherwise disfigure and impair the smoothness of the surface.

It will be understood that equivalent results can, in many instances, be obtained by holding the tube against longitudinal advancement and advancing the rotating rolls against the tube or revolving the entire group of rolls around the end of the tube, the resulting action in each case, serving to subject the end of the tube to a

I claim:

1. In a machine for reducing tubing, the combination of a frame, a head plate upstanding from the frame and provided with rearward extensions, three sets of aligned front and rear bearings, the front bearings being carried by the head plate and the rear bearings by the extensions, and the sets of bearings serving to journal three parallel shafts equidistantly spaced from one another around a common center, each of the shafts having mounted thereon a roll of generally tapering configuration and of enlarging diameter in the direction of advance of the tube and defining between the rolls an increasingly restricted roll pass for the reduction of a tube, each of the rolls having its surface spirally bluntly ridged with the ridge crests separated from one another sufficiently to insure edge contact only against the tube surface, a carriage and means for advancing the same toward the roll pass at the desired rate of speed, a rotatably mounted chuck carried by the carriage and adapted to grip the rear end of a tube, a rotatably mounted centering sleeve having axial coincidence with the axis of the roll pass and adapted to have a tube projected therethrough when advanced toward the roll pass, and means for positively rotating the rolls in unison at any desired rate of speed in ratio to the advance of the carriage.

2. In a machine for reducing tubing, the combination of a frame, a head plate upstanding from the frame and provided with rearward extensions, three sets of aligned front and rear bearings, the front bearings being carried by the head plate and the rear bearings by the extensions, and the sets of bearings serving to journal three parallel shafts equidistantly spaced from one another around a common center, each of the shafts having mounted therein a roll of generally tapering configuration and of enlarging diameter in the direction of advance of the tube and defining between the rolls an increasingly restricted roll pass for the reduction of a tube, each of the rolls having its surface spirally bluntly ridged with the ridge crests separated from one another sufficiently to insure edge contact only against the tube surface, a carriage and means for advancing the same toward the roll pass at the desired rate of speed, a rotatably mounted chuck carried by the carriage and adapted to grip the rear end of a tube, a rotatably mounted centering sleeve having axial coincidence with the axis of the roll pass and adapted to have a tube projected therethrough when advanced toward the roll pass, a pinion on each of the roll shafts, an internal gear meshing with all of the pinions, a rotatable mounting for the internal gear, and means for effecting a rolling contact between the spiral ridge crests and the tube surface in such manner as to cause an ironing out of the incipient grooves simultaneously with the reduction of the tube.

3. In a machine for reducing tubing, the combination of a frame, a plurality of sets of bearings carried by the frame, a plurality of parallel shafts journaled within the bearings and equidistantly spaced from one another around a common center, each of the shafts having mounted thereon a roll of generally tapering configuration and of enlarging diameter in the direction of advance of the tube and defining between the rolls an increasingly restricted roll pass for the reduction of a tube, each of the rolls having its surface spirally bluntly ridged with the ridge crests separated from one another sufficiently to insure edge contact only against the tube surface, a carriage and means for advancing the same toward the roll pass at the desired rate of speed, a rotatably mounted chuck carried by the carriage and adapted to grip the rear end of a tube, a rotatably mounted centering sleeve having axial coincidence with the axis of the roll pass and adapted to have a tube projected therethrough when advanced toward the roll pass, and means for effecting a rolling contact between the spiral ridge crests and the tube surface in such manner as to effect an ironing action on surface simultaneously with the reduction of the tube.

4. In a machine for reducing tubing, the combination of a frame, a plurality of sets of bearings carried by the frame, a plurality of parallel shafts journaled within the bearings and equidistantly spaced from one another around a common center, each of the shafts having mounted thereon a roll of generally tapering configuration and of enlarging diameter in the direction of advance of the tube and defining between the rolls an increasingly restricted roll pass for the reduction of a tube, each of the rolls having its surface spirally bluntly ridged with the ridge crests separated from one another sufficiently to insure edge contact only against the tube surface, a carriage and means for advancing the same toward the roll pass at the desired rate of speed, a rotatably mounted chuck carried by the carriage and adapted to grip the rear end of a tube, a rotatably mounted centering sleeve having axial coincidence with the axis of the roll pass and adapted to have a tube projected therethrough when advanced toward the roll pass, a pinion on each of the roll shafts, an internal gear meshing with all of the pinions, a rotatable mounting for the internal gear, and means for rotating the mountings at any desired rate of speed in ratio to the advance of the carriage.

5. In a machine for reducing tubing, the combination of a frame, a plurality of sets of bearings carried by the frame, a plurality of parallel shafts journaled within the bearings and equidistantly spaced from one another around a common center, each of the shafts having mounted thereon a roll of generally tapering configuration and of enlarging diameter in the direction of advance of the tube and defining between the rolls an increasingly restricted roll pass for the reduction of a tube, each of the rolls having its surface spirally bluntly ridged with the ridge crests separated from one another sufficiently to insure edge contact only against the tube surface, a carriage and means for advancing the same toward the roll pass at the edsired rate of speed, a rotatably mounted chuck carried by the carriage and adapted to grip the rear end of a tube, and a means for positively rotating the rolls in unison at any desired rate of speed in ration to the advance of the carriage.

6. In a machine for reducing tubing, the combination of a frame, a plurality of sets of bearings carried by the frame, a plurality of parallel shafts journaled within the bearings and equidistantly spaced from one another around a common center, each of the shafts having mounted thereon a roll of generally tapering configuration and of enlarging diameter in the direction of advance of the tube and defining between the rolls an increasingly restricted roll pass for the reduction of a tube, each of the rolls having its surface spirally bluntly ridged with the ridge crests separated from one another sufficiently to insure edge contact only against the tube surface, a carriage and means for advancing the same toward the roll pass at the desired rate of speed, a rotatably mounted chuck carried by the carriage and adapted to grip the rear end of a tube, a pinion on each of the roll shafts, an internal gear meshing with all of the pinions, a rotatable mounting for the internal gear, and means for rotating the mounting at any desired rate of speed in ratio to the advance of the carriage.

CLARENCE L. DEWEY.